US012619592B2

(12) United States Patent　　　　(10) Patent No.:　US 12,619,592 B2
Kruempelmann et al.　　　　　　　(45) Date of Patent:　May 5, 2026

(54) EXTERNAL DATABASE AS SOURCE FOR LOCAL SYSTEM CUSTOMIZING

(71) Applicant: SAP SE, Walldorf (DE)

(72) Inventors: Wulf Kruempelmann, Altlussheim (DE); Volker Zirkel, Mannheim (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/075,679

(22) Filed: Dec. 6, 2022

(65) Prior Publication Data

US 2024/0184762 A1　　Jun. 6, 2024

(51) Int. Cl.
*G06F 16/22*　　　　(2019.01)
*G06F 16/21*　　　　(2019.01)
*G06F 16/23*　　　　(2019.01)

(52) U.S. Cl.
CPC ........ *G06F 16/2282* (2019.01); *G06F 16/219* (2019.01); *G06F 16/2365* (2019.01)

(58) Field of Classification Search
None
See application file for complete search history.

(56) References Cited

U.S. PATENT DOCUMENTS

| | | | |
|---|---|---|---|
| 10,311,076 B1 * | 6/2019 | Bruhn | G16H 10/60 |
| 11,886,434 B1 * | 1/2024 | Magnuson | G06F 9/44505 |
| 2002/0059280 A1 * | 5/2002 | Slesinsky | G06F 8/65 |
| 2018/0329782 A1 * | 11/2018 | Kludy | G06F 11/3006 |
| 2019/0129990 A1 * | 5/2019 | Schlarb | G06F 16/2365 |
| 2019/0129991 A1 * | 5/2019 | Auer | G06F 16/2264 |
| 2021/0157978 A1 * | 5/2021 | Haramati | G06F 40/177 |
| 2021/0173626 A1 * | 6/2021 | Kruempelmann | G06F 11/3664 |
| 2022/0335019 A1 * | 10/2022 | Bengoa | G06F 16/214 |

* cited by examiner

*Primary Examiner* — Neveen Abel Jalil
*Assistant Examiner* — John J Morris
(74) *Attorney, Agent, or Firm* — Mintz Levin Cohn Ferris Glovsky and Popeo, P.C.

(57) ABSTRACT

A method, a system, and computer program product for customizing settings of cloud-based software applications using an external database as a source are provided. A request to generate a new database table corresponding to a new version of a database table associated with a cloud-based system hosting a cloud-based software application is received. The request is processed to determine a content of the new database table using a data structure of the database table. A version identifier corresponding to the new database table is generated. The version identifier and the new database table are provided, to an external database for storage. A deployment, to a productive system, of the new database table, is controlled for the new database table to be used when executing the cloud-based software application.

14 Claims, 4 Drawing Sheets

EXTERNAL DATABASE AS SOURCE FOR LOCAL SYSTEM CUSTOMIZING

TECHNICAL FIELD

The present disclosure generally relates to cloud computing and, more specifically, to customizing cloud computing systems using an external database as a source.

BACKGROUND

An application can be hosted by a cloud platform such that the application can be remotely accessible to multiple tenants, for example, over the Internet. For example, the application can be available as a cloud-based service including, for example, a software as a service (SaaS) and/or the like. Many organizations can rely on such cloud-based software applications including, for example, enterprise resource planning (ERP) software, customer relationship management (CRM) software, and/or the like. The settings, stored as tables, can define processes executable by the ERP and the CRM systems. Customization of settings using a staging table can involve a complex activation process that can conflict with some processes executed by the ERP and the CRM systems.

SUMMARY

Methods, systems, and articles of manufacture, including computer program products, are provided for customizing cloud computing systems using an external database as a source. In one aspect, a computer-implemented method includes: receiving, by one or more processors, a request to generate a new database table corresponding to a new version of a database table associated with a cloud-based system hosting a cloud-based software application; processing, by the one or more processors, the request to determine a content of the new database table using a data structure of the database table; generating, by the one or more processors, a version identifier corresponding to the new database table; providing, by the one or more processors to an external database, the version identifier and the new database table for storage; and controlling, by the one or more processors, a deployment, to a productive system, of the new database table, for the new database table to be used when executing the cloud-based software application.

In some variations, one or more features disclosed herein including the following features can optionally be included in any feasible combination. In some implementations, the computer-implemented method further includes: performing, by the one or more processors, a validation of the new database table by verifying each entry of the content of the new database table; and generating, by the one or more processors, a deployment approval for enabling the deployment, to the productive system, of the new database table. In some implementations, controlling, by the one or more processors, the deployment, to the productive system, of the new database table is based on a schedule associated with the version identifier of the new database table, the schedule indicating a time for switching from an old version of the database table to the new version of the new database table. In some implementations, the database table is stored in an original database different from the external database. In some implementations, the new database table includes one or more customizations specific to a tenant associated with the cloud-based system. In some implementations, the request to generate the new database table is provided by an external customizing repository configured to directly write data in the external database. In some implementations, the deployment, to the productive system, of the new database table includes reading entries of the new database table directly from the external database using the version identifier.

In another aspect, a non-transitory computer-readable storage medium includes programming code, which when executed by at least one data processor, causes operations including: receiving a request to generate a new database table corresponding to a new version of a database table associated with a cloud-based system hosting a cloud-based software application; processing the request to determine a content of the new database table using a data structure of the database table; generating a version identifier corresponding to the new database table; providing, to an external database, the version identifier and the new database table for storage; and controlling a deployment, to a productive system, of the new database table, for the new database table to be used when executing the cloud-based software application.

In some variations, one or more features disclosed herein including the following features can optionally be included in any feasible combination. In some implementations, the operations further include: performing a validation of the new database table by verifying each entry of the content of the new database table; and generating a deployment approval for enabling the deployment, to the productive system, of the new database table. In some implementations, controlling the deployment, to the productive system, of the new database table is based on a schedule associated with the version identifier of the new database table, the schedule indicating a time for switching from an old version of the database table to the new version of the new database table. In some implementations, the database table is stored in an original database different from the external database. In some implementations, the new database table includes one or more customizations specific to a tenant associated with the cloud-based system. In some implementations, the request to generate the new database table is provided by an external customizing repository configured to directly write data in the external database. In some implementations, the productive system, of the new database table includes reading entries of the new database table directly from the external database using the version identifier.

In another aspect, a system includes: at least one data processor; and at least one memory storing instructions, which when executed by the at least one data processor, cause operations including: receiving a request to generate a new database table corresponding to a new version of a database table associated with a cloud-based system hosting a cloud-based software application; processing the request to determine a content of the new database table using a data structure of the database table; generating a version identifier corresponding to the new database table; providing, to an external database, the version identifier and the new database table for storage; and controlling a deployment, to a productive system, of the new database table, for the new database table to be used when executing the cloud-based software application.

In some variations, one or more features disclosed herein including the following features can optionally be included in any feasible combination. In some implementations, the operations further include: performing a validation of the new database table by verifying each entry of the content of the new database table; and generating a deployment approval for enabling the deployment, to the productive system, of the new database table. In some implementations, controlling the deployment, to the productive system, of the new database table is based on a schedule associated with the version identifier of the new database table, the schedule indicating a time for switching from an old version of the database table to the new version of the new database table. In some implementations, the database table is stored in an original database different from the external database. In some implementations, the new database table includes one or more customizations specific to a tenant associated with the cloud-based system. In some implementations, the request to generate the new database table is provided by an external customizing repository configured to directly write data in the external database. In some implementations, the productive system, of the new database table includes reading entries of the new database table directly from the external database using the version identifier.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that can include one or more processors and one or more memories coupled to the one or more processors. A memory, which can include a non-transitory computer-readable or machine-readable storage medium, can include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to customization of database tables, it should be readily understood that such features are not intended to be limiting. The claims that follow this disclosure are intended to define the scope of the protected subject matter.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

Figure 1:
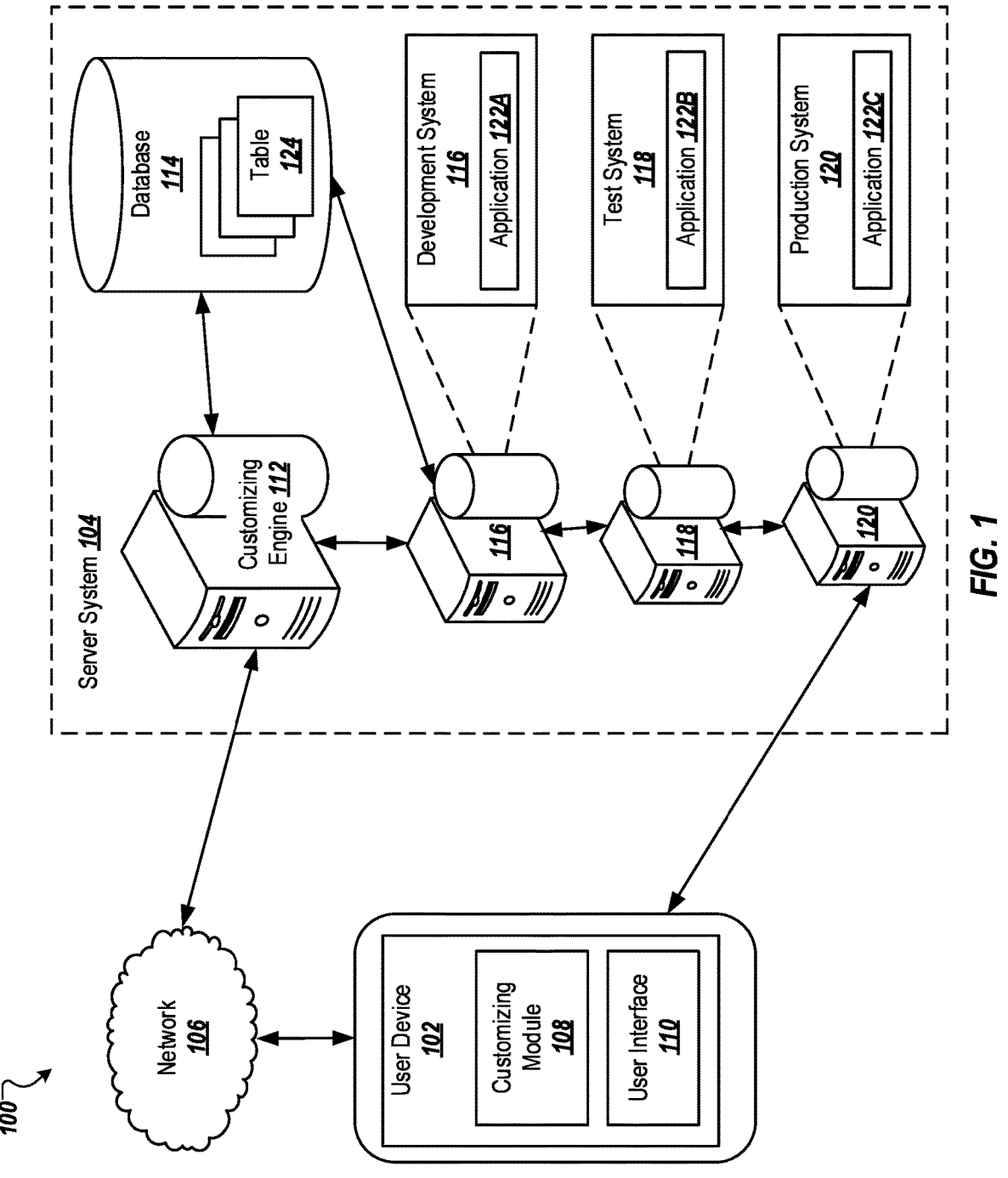
FIG. 1 depicts a diagram illustrating an example of a system, in accordance with some example implementations.

When practical, like labels are used to refer to same or similar items in the drawings.

DETAILED DESCRIPTION

Implementations of the present disclosure are generally directed to cloud-based software applications operating in cloud computing systems. More particularly, implementations of the present disclosure are directed to customizing settings of cloud-based software applications using an external database as a source. The settings of cloud-based software applications can be stored in one or more database tables. The settings of cloud-based software applications can include a template defining the manner, in which data is stored in the database tables. For example, the template can specify the columns that form the entries occupying the rows in each one of the database tables. In some example implementations, the cloud-based software application can be delivered to different tenants with a set of default templates. Each tenant can subsequently select, based on individual requirements, one or more of the default templates. For instance, a tenant can select a default template specific to the tenant's industry. The tenant can further customize the cloud-based software application by applying, to the selected template, one or more tenant-specific customizations prior to deploying the customized template as part of that tenant's cloud-based system. Accordingly, each deployment of the cloud-based software application can be customized to operate on database tables storing data in a tenant-specific manner.

In some example implementations, a single tenant can be associated with multiple cloud-based systems. Each cloud-based system can host a different cloud-based software application including, for example, an enterprise resource planning (ERP) software application, a customer relationship management (CRM) software application, and/or the like. Nevertheless, the different cloud-based software applications can operate on at least some common data such as, for example, service plan data, order data, item data, and/or the like. The tenant can customize the template deployed at the cloud-based system hosting the ERP software application. The tenant-specific customizations can include, for instance, modifications to the manner in which data is stored in a database table associated with the template. Moreover, the tenant-specific customizations can be propagated through different systems (e.g., development system, testing system, and production system) of the cloud-based system hosting the customer relationship management software application such that the same tenant-specific customizations are deployed at each corresponding system.

Traditional customization of database tables settings are based on external tools that determine the customizing setting from one or more customer scope variants and use a staging table for data replication. In particular, the data, determined by external tools, can be transferred to the ERP system via web service and stored in a staging table. The staging table can be used to replicate the data into the original ERP tables. The data replication using the staging table results in an additional consumption of storage resources, which can have a massive impact of the system especially for tables with large sizes (thousands of dimensions). Additionally, the processes involved in the traditional customization settings can be very complex involving large computational resources. The execution of the processes involved in the traditional customization settings can have a long runtime, which can disturb other processes of the cloud-based systems.

The customization settings described herein uses an external database, which can store new database tables that have the same data structure as older versions of the database tables in the original ERP system. The external customizing repository directly writes to the external database, using a branch number including a (numerical) identifier of a version of the database table being customized. The different components of the cloud-based (e.g., ERP) system (e.g., development system, testing system, and production system) can read the new database tables, from the external database, identifying them using the branch number. The direct access to the new database tables from the external database, enables elimination of new database table replication, minimizing storage resources and optimizing computational resources involved in customization of database table settings.

FIG. 1 depicts an example of a system 100, in accordance with some example implementations. Referring to FIG. 1, the example system 100 includes a user device 102, a server system 104, and a network 106. In the depicted example, the user device 102 includes a customizing module 108 and a user interface 110. The customizing module 108 can interact with the server system 104 to edit tenant-specific customizations to be stored, by the server system 104, as new database tables to be used during execution of cloud-based software application. For example, the customizing module 108 can be configured to enable transmission of a request to generate a new database table corresponding to new version of a database table 124, stored by an external database 114 of the server system 104 hosting a cloud-based software application 122. The user interface 110 can enable an entry of a user input including the user authentication information, a table (e.g., table name and table version) selection, and table modification (customization).

The user device 102 can be and/or include any type of processor and memory based device, such as, for example, cellular phones, smart phones, tablet computers, laptop computers, desktop computers, workstations, personal digital assistants (PDA), network appliances, cameras, enhanced general packet radio service (EGPRS) mobile phones, media players, navigation devices, email devices, game consoles, or an appropriate combination of any two or more of these devices or other data processing devices. Even though, not illustrated, in some implementations, multiple user devices 102 including different computing system configurations, such as different operating systems, different processing capabilities, different hardware components, and/or other differences can concurrently request services, from the server system 104. The user device 102 can include any combination of fixed and variable computing components.

As shown in FIG. 1, the user device 102 can be communicatively coupled, via the network 106, with the server system 104 during an authenticated session to enable tenant-specific customizations. It should be appreciated that the network 106 can be any wired and/or wireless network including, for example, a public land mobile network (PLMN), a local area network (LAN), a wide area network (WAN), the Internet, a cellular network, a telephone network (e.g., PSTN) or an appropriate combination thereof connecting any number of communication devices, mobile computing devices, fixed computing devices, server systems, and/or the like.

The server system 104 can include any form of servers including, but not limited to a web server (e.g., cloud-based server), an application server, a proxy server, a network server, and/or a server pool. In general, the server system 104 accepts requests for services of applications 122A, 122B, 1222C that enable tenant specific customization and provides such services to any number of user devices (e.g., the user device 102) over the network 106. The server system 104 can include a customizing engine 112, an external database 114, a development system 116, a test system 118, and a production system 120. The external database 114 can be include a multitenant database architecture (e.g., multitenant database containers (MDC)), such that each tenant of the server system 104 (using a respective user device 102) can customize respective tables 124 stored by the external database 114 and can be served by separate instances of the server system 104.

The external database 114 can include a cloud database system environment, such as, Analytics Cloud (SAC) Data Warehouse Cloud or High performance Analytic Appliance (HANA), as available from SAP AG, Walldorf, Germany although other types of databases can be used as well. In some implementations, the external database 114 can include an on-premise database system (e.g., system databases, tenant databases, etc.), servers (e.g., name server(s), index server(s), script server(s), etc.). The external database 114 can store multiple tables 124 that can be accessible (e.g., via queries, procedure calls, etc.) by the customizing engine 112, in response to a customization request received from the user device 102 and by cloud-based software applications 122A, 122B, 122C. The external database 114 can include a runtime database that holds most recent database tables 124 and respective branch numbers to enable customization of application settings according to tenant preferences.

As shown in FIG. 1, the server system 104 can host the customizing engine 112 to manage customization of a cloud-based software application 122A, 122B, 122C that is executed by the development system 116, the test system 118, and the production system 120 in a development mode, a testing mode, and a production mode, respectively. For instance, the cloud-based software application 122A, 122B, 122C can be an enterprise resource planning (ERP) software application or a customer relationship management (CRM) software application. It should be appreciated that the cloud-based software application 122A, 122B, 122C can be any cloud-based software application. For example, the cloud-based software application 122A, 122B, 122C can be any cloud-based software application providing a variety of data processing functionalities including, for example, payroll, time and attendance management, recruiting and onboarding, learning and development, performance and compensation, workforce planning, and/or the like.

In some example implementations, the cloud-based software application 122A, 122B, 122C can operate on data stored in one or more database tables. For example, the cloud-based software application 122A, 122B, 122C can store, retrieve, update, and/or delete data from one or more database tables. As such, the cloud-based software application 122A, 122B, 122C can be implemented based on templates that define the manner in which data is stored in the database tables.

To further illustrate, Table 1 below depicts a pseudo programming code for a template defining the manner in which data is stored in a database table. In the example shown in Table 1, the template can include extensible markup language (XML) defining the manner in which data is stored in a database table.

TABLE 1

```
<item>
  <object_name> manufacturing method </object_name>
  <object_type> table_content</object_type>
  <table_name>tab_manufacuring</table_name>
  <field> method</field>
  <content>batch</content>
  <field>product</field>
  <content>medicine</content>
</item>
```

As shown in FIG. 1, the cloud-based software application 122A, 122B, 122C can operate on data in a respective table 124 stored in the external database 114. The cloud-based software application 122A, 122B, 122C can be implemented based on a template defining the manner, in which data is stored in the table 124. For instance, the cloud-based software application 122A, 122B, 122C can be implemented based on a template specifying the columns that form the entries occupying the rows in the table 124. The customization of tables 124 is further described in detail with reference to FIGS. 2 and 3.

The table 124 can include multidimensional data that be formatted to include multiple rows and/or columns of very large (thousands) dimensions. For instance, the table can include columns that have different names (e.g., DATE_TYPE, PAYPLAN_TYPE, and P_DESCR) and different data type (numerical, characters, date, and/or logical). The columns in a table 124 can be mapped to corresponding columns in another table and/or a combination of data from multiple columns from multiple tables, according to a logical operation.

Within a context example, the table 124 can store the service plan data that is associated with the cloud-based software application 122A, 122B, 122C including an enterprise resource planning (ERP) software application or a customer relationship management software application. A tenant can provide a user input using the user device 102 to indicate a preferred format of the table 124 to store service data, which can be different from a preset standard format or a format selected by another tenant. Accordingly, the cloud-based software application 122A, 122B, 122C can be implemented based on different templates defining the different manners in which data is stored at the database 114 (e.g., in the table 124).

Figure 2:
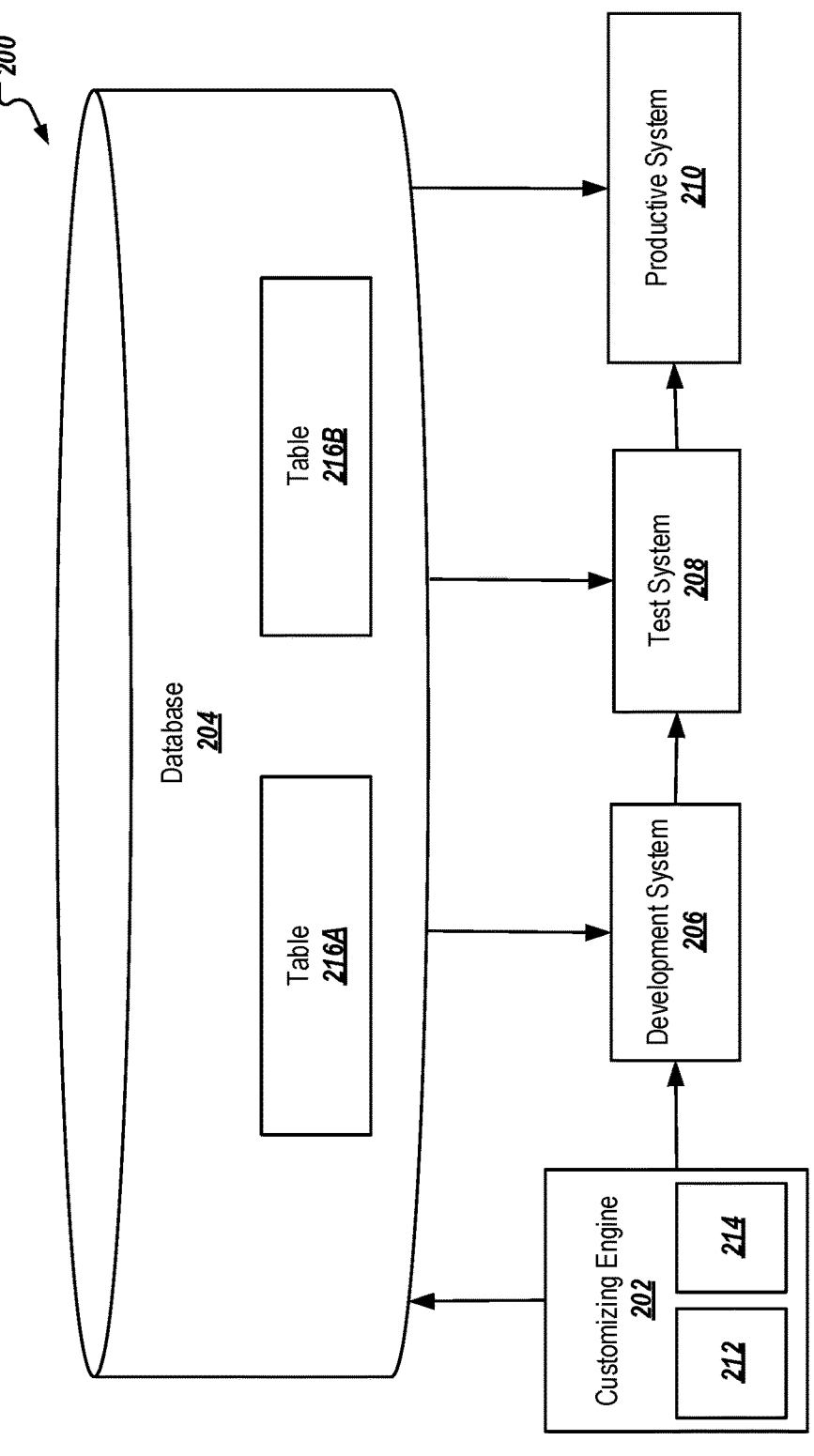
FIG. 2 depicts an example of a system architecture, in accordance with some example implementations.

FIG. 2 depicts a block diagram illustrating an example of a customization system 200, in accordance with some example implementations. The customization system 200 can be integrated in one or more server systems, such as server system 104 described with reference to FIG. 1. The customization system 200 can include a customizing engine 202 (e.g., customizing engine 112 described with reference to FIG. 1), an external database 204 (e.g., external database 114 described with reference to FIG. 1), a development system 206 (e.g., development system 116 described with reference to FIG. 1), a test system 208 (e.g., test system 118 described with reference to FIG. 1), and a production system 210 (e.g., production system 120 described with reference to FIG. 1).

In some example implementations, the customizing engine 202 can include a customization controller 212 and a mapping engine 214. The customization controller 212 can be configured to generate a new version of a table 216A including changes relative to an existing table 216B (e.g., table 124 described with reference to FIG. 1) as a result of a user device (e.g., user device 102 described with reference to FIG. 1) requesting customization of the existing table 216B. The table customization request can include a customized template having one or more customizations that are specific to a tenant associated with the client. In some implementations, the customizing engine 202 can include a database trigger configured to monitor changes to the table 216B. The database trigger of the customizing engine 202 can be further configured to alert the development system 206 when a new table version 216A is generated with an active branch number, thereby enabling the new table version 216A to be propagated to the test system 208 and the productive system 210.

In response to receiving a request to generate a new database table 216A corresponding to new version of an existent older version of a database table 216B associated with a cloud-based system hosting a cloud-based software application, the customization controller 212 can execute customization of the data included in the previously stored table 216B. The customization data related to a particular version of the table 216A, 216B can include an extensible markup language (XML) format and/or a different format. The customization data, received by the customizing engine 202 from the user device, can include, a definition of a scope of the particular version of the table 216A, 216B in the external customizing system.

The customization data can be sent to the mapping engine 214 that can use an index to identify a data structure corresponding to a table identifier and a particular table version of a particular table 216A, 216B stored in the database 204. In some implementations, the mapping engine 214 can identify, based at least on the customization data, one or more tenant-specific customizations that have been applied to the template deployed at the customization system 200. The one or more tenant-specific customizations can include any type of modifications to the template deployed at customization system 200. For example, the client can have customized the template that is deployed at the customization system 200 to modify the data that is stored in accordance with the template including, for instance, an account type, an account statement version, a manufacturing method, and/or the like. Alternatively and/or additionally, the client can have customized the template deployed at the customization system 200 to modify the datatype of the data that is stored in a particular column (e.g., DATE_TYPE column) from a first datatype (e.g., CHAR datatype) to the second datatype (e.g., DATE datatype). Accordingly, the mapping engine 214 can compare the data from the table 216B against the template that is currently deployed at the database 204 to determine differences in the manner, in which the data is being stored in the table 216B to generate the new version of table 216A.

The customizing engine 202 can calculate the required table contents for the new version of the table 216A and can store the entries to the database 204, using a branch number as primary identification key. The customizing engine 202 can transfer the primary key associated with the table 216A, 216B to the development system 206 using a web service communication protocol such as, for example, simple object access protocol (SOAP), representational state transfer (REST) protocol, and/or the like. For instance, the customizing engine 202 can transfer the primary key associated with the table 216A, 216B by at least invoking, a hypertext transfer protocol (HTTP) PUT method, a hypertext transfer protocol POST method, and/or the like.

In some implementations, the development system 206 uses the branch number for enabling identification the new version of the table 216A stored in the external database 204. The table 216A can be accessed using an open data (oData) protocol that allows the creation and consumption of queryable and interoperable REST application programming interfaces (API) in a computationally efficient way. The oData service can transmit the request for the new version of the table 216A using a structured query language (SQL) statement together with the branch number to the external database 204. In some implementations, such requests can be performed using one or more commands (e.g., SQL commands) that can be submitted by the development system 206, the test system 208, and/or the productive system 210. The SQL commands can be submitted to the database 204 by an application, a computing system, and/or any other component of the development system 206, the test system 208, and/or the productive system 210.

In some implementations, the new version of the table 216A can be transported, using the branch number as an identifier of the new version of the table 216A rather than effectively transmitting new version of the table 216A itself), to the test system 208. The test system 208 can be configured to test the new version of the table 216A, as completed by the development system 206, and if testing is successful, the test system 208 can automatically trigger the import of the new version of the table 216A to the productive system 210, using the branch number, where the new version of the table 216A can be used as for productive customizing according to one or more conditions (e.g., a scheduled switch from the old version of the table 216B to the new version of the table 216A). Further details regarding the process performed by the customization system 200 are described with reference to FIG. 3.

Figure 3:
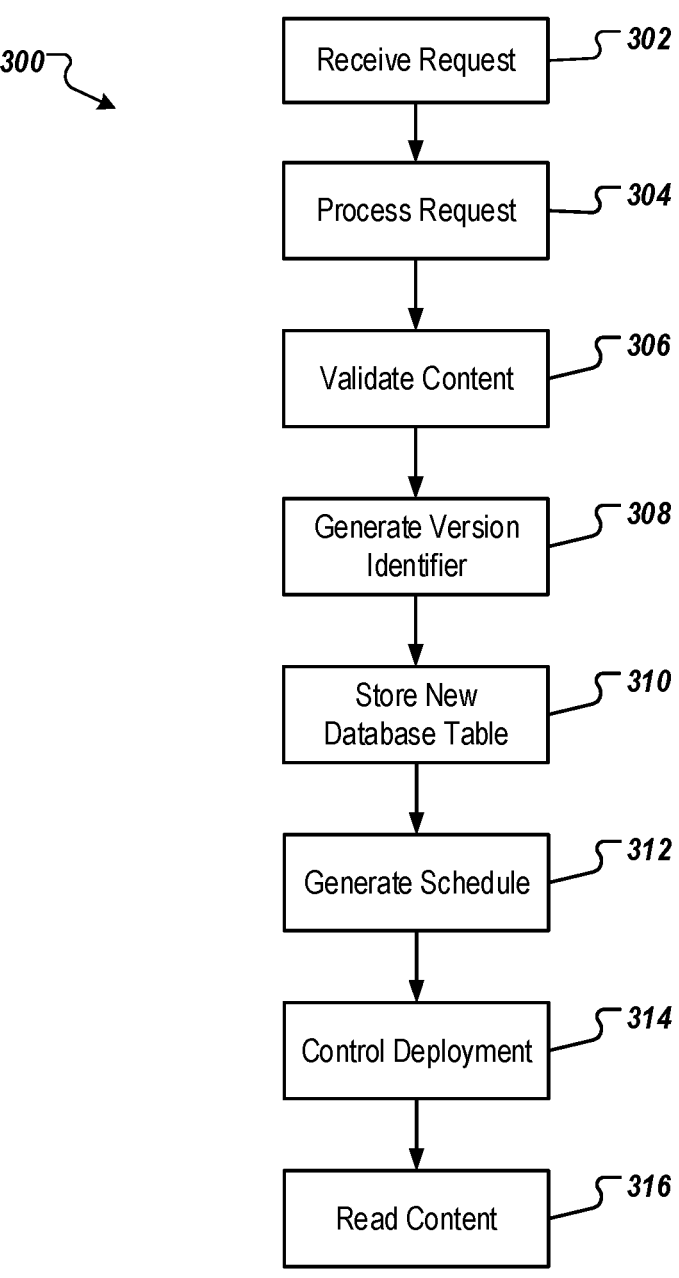
FIG. 3 depicts a process for customizing database tables, in accordance with some example implementations.

FIG. 3 depicts a flowchart illustrating a process 300 for customizing a database table, in accordance with some example implementations. The process 300 can be executed by the system 100 shown in FIG. 1, using the customization system 200 shown in FIG. 2, the system 400 shown in FIG. 4 or any combination thereof.

At 302, a request to generate a new database table corresponding to a new version of a database table associated with a cloud-based system hosting a cloud-based software application is received. The new database table can include one or more customizations specific to a tenant associated with the cloud-based system. The request to generate the new database table can be provided by an external customizing repository configured to directly write data in the external database.

At 304, the request is processed to determine a content of the new database table using the data structure of the database table. The new database table can include a template to be deployed at a productive system of a cloud-based system. The template can define the manner in which data is stored at a database associated with the productive system according to a tenant-specific customization. For example, a template can specify a data structure of the database table including multiple columns (e.g., DATE_TYPE, PAYPLAN_TYPE, P_DESCR, and/or the like) that form the entries occupying the rows in the respective database table. A cloud-based software application, which can be an enterprise resource planning (ERP) software application, can operate on data stored in the table. Accordingly, in some example implementations, the client can customize the cloud-based software application by at least applying, one or more tenant-specific customizations to the template of the database table, that modify, for example, the manner in which the data that is being operated upon by the cloud-based software application is stored in the database table. For instance, the one or more tenant-specific customizations can define a new version of a database table that includes a change to the datatype of the data in the DATE_TYPE column and the P_DESCR column of the old version of the database table. The template can include the one or more tenant-specific modifications that can be deployed at the cloud-based system to at least cause a change to the manner in which data is stored in the table.

At 306, the content of the new database table is validated by verifying each entry of the content of the new database table. In some implementations the validation is performed by one or more systems of the cloud system, such as a customizing engine. As noted, the template can define the manner in which data is stored in the new version of the database table including, for example, by specifying the columns (e.g., DATE_TYPE, PAYPLAN_TYPE, P_DE-SCR, and/or the like) that form the entries occupying the rows in the new version of the database table. The cloud-based software application, which can be an enterprise resource management (ERM) software application, can operate on the data stored in the new version of the database table including by, for example, storing, updating, deleting, and/or retrieving, data from the new version of the database table. Accordingly, changing the template, for example, by applying one or more customizations specific to the tenant associated with the client, can alter the structure of the data that is stored as the new version of the database table. The alterations, corresponding to each entry of the content of the new database table would have to be validated to ensure that each function of the cloud-based software application is executable.

At 308, in response to successfully completing the validation, a version identifier corresponding to the new database table is generated as a branch number. In some implementations the branch number is generated by the customizing engine, and is transmitted to the development system, the test system, and the productive system, to enable access to the new version of the database table stored in the external database, without requiring the transmission of the database table to any of the development system, the test system, and the productive system.

At 310, a new database table, with the validated content, is stored in an external database being mapped to the branch number. Any of the development system, the test system, and the productive system can uses the branch number for enabling identification the new version of the table stored in the external database. The new version of the database table can be accessed using an open data (oData) protocol that allows the creation and consumption of queryable and interoperable REST application programming interfaces (API) in a computationally efficient way. The oData service can transmit the request for the new version of the table using a structured query language (SQL) statement together with the branch number to the external database. In some implementations, such requests can be performed using one or more commands (e.g., SQL commands) that can be submitted by the development system, the test system, and/or the productive system. The SQL commands can be submitted to the database by an application, a computing system, and/or any other component of the development system, the test system, and/or the productive system.

At 312, a schedule is generated to plan the deployment of the new version of the database table by a productive system according to one or more conditions. The schedule can include a time (e.g., a selected day and time) for switching from an old version of the database table to the new version of the new database table. The schedule can be based on one or more factors that can be associated with the version of the database table. For example, if the version of the database table is related to a rule change, a legislative code change (corresponding to a country or state legislation applicable to the entity using the database table for a could software application), and/or an entity change, the schedule can be set to enable deployment of the new version of the database table to match a timing of the change of the factors associated with the version of the database table.

At 314, deployment of the new version of the database table is controlled according to the schedule. The deployment of the new database table can be controlled for the new database table to be used by a productive system when executing the cloud-based software application. The old version of the database table can be stored in an original database (e.g., a database within the productive system) different from the external database.

At 316, the content of the new version of the database table is read in the productive system. The deployment, to the productive system, of the new database table can include reading entries of the new database table directly from the external database using the version identifier (branch number). For example, as noted, the client can have customized the template deployed at the cloud-based system to generate the new version of the database table that modifies the datatype of the data that is stored in DATE_TYPE column from the CHAR datatype to the DATE datatype and the datatype of the data that is stored in the P_DESCR column from the datatype MEDIUMTEXT to the datatype LONG-TEXT. In response to the activation of the new version of the database table at the productive system, any subsequent use of the cloud-based software application automatically uses the new version of the database table, while the old version of the database table becomes inactive. For instance, activating the new version of the database table at the productive system can change the datatypes of the data that is stored in the DATE_TYPE column and the P_DESCR column of the table.

The example process 300 enables a computationally efficient switch from one version of the database table to a newer or older version of the database table, without requiring any of the development system, the test system, and/or the productive system to be available, the switch being dictated by the use of the corresponding version number (branch number) of the database table. Using the example process 300, different components of the cloud-based (e.g., ERP) system (e.g., development system, testing system, and production system) can read the new database tables, from the external database, identifying them using the branch number. The direct access to the new database tables from the external database, enables elimination of new database table replication, minimizing storage resources, and optimizing computational resources involved in customization of database table settings.

Figure 4:
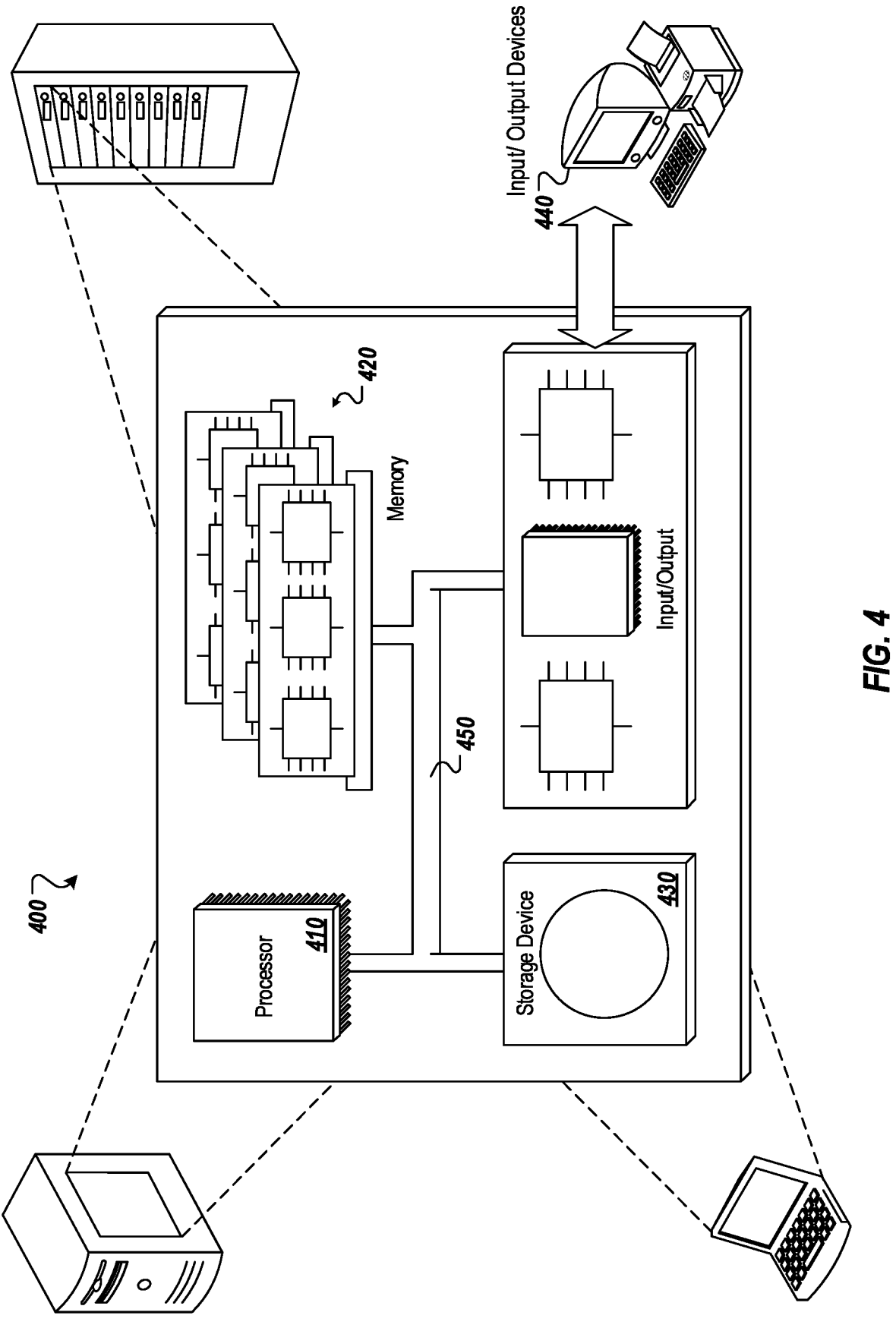
FIG. 4 depicts a diagram illustrating a computing system, in accordance with some example implementations.

In some implementations, the current subject matter can be configured to be implemented in a system 400, as shown in FIG. 4. The system 400 can include a processor 410, a memory 420, a storage device 430, and an input/output device 440. Each of the components 410, 420, 430 and 440 can be interconnected using a system bus 450. The processor 410 can be configured to process instructions for execution within the system 400. In some implementations, the processor 410 can be a single-threaded processor. In alternate implementations, the processor 410 can be a multi-threaded processor. The processor 410 can be further configured to process instructions stored in the memory 420 or on the storage device 430, including receiving or sending information through the input/output device 440. The memory 420 can store information within the system 400. In some implementations, the memory 420 can be a computer-readable medium. In alternate implementations, the memory 420 can be a volatile memory unit. In yet some implementations, the memory 420 can be a non-volatile memory unit. The storage device 430 can be capable of providing mass storage for the system 400. In some implementations, the storage device 430 can be a computer-readable medium. In alternate implementations, the storage device 430 can be a floppy disk device, a hard disk device, an optical disk device, a tape device, non-volatile solid state memory, or any other type of storage device. The input/output device 440 can be configured to provide input/output operations for the system 400. In some implementations, the input/output device 440 can include a keyboard and/or pointing device. In alternate implementations, the input/output device 440 can include a display unit for displaying graphical user interfaces.

In some implementations, one or more application function libraries in the plurality of application function libraries can be stored in the one or more tables as binary large objects. Further, a structured query language can be used to query the storage location storing the application function library.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more user device computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include user devices and servers. A user device and server are generally, but not exclusively, remote from each other and typically interact through a communication network. The relationship of user device and server arises by virtue of computer programs running on the respective computers and having a user device-server relationship to each other.

Further non-limiting aspects or implementations are set forth in the following numbered examples:

Example 1: A computer-implemented method comprising: receiving, by one or more processors, a request to generate a new database table corresponding to a new version of a database table associated with a cloud-based system hosting a cloud-based software application; processing, by the one or more processors, the request to determine a content of the new database table using a data structure of the database table; generating, by the one or more processors, a version identifier corresponding to the new database table; providing, by the one or more processors to an external database, the version identifier and the new database table for storage; and controlling, by the one or more processors, a deployment, to a productive system, of the new database table, for the new database table to be used when executing the cloud-based software application.

Example 2: The computer-implemented method of example 1, further comprising: performing, by the one or more processors, a validation of the new database table by verifying each entry of the content of the new database table; and generating, by the one or more processors, a deployment approval for enabling the deployment, to the productive system, of the new database table.

Example 3: The computer-implemented method of example 1 or 2, wherein controlling, by the one or more processors, the deployment, to the productive system, of the new database table is based on a schedule associated with the version identifier of the new database table, the schedule indicating a time for switching from an old version of the database table to the new version of the new database table.

Example 4: The computer-implemented method of any of examples 1 to 3, wherein the database table is stored in an original database different from the external database.

Example 5: The computer-implemented method of any of examples 1 to 4, wherein the new database table comprises one or more customizations specific to a tenant associated with the cloud-based system.

Example 6: The computer-implemented method of any of examples 1 to 5, wherein the request to generate the new database table is provided by an external customizing repository configured to directly write data in the external database.

Example 7: The computer-implemented method of any of examples 1 to 6, wherein the deployment, to the productive system, of the new database table comprises reading entries of the new database table directly from the external database using the version identifier.

Example 8: A non-transitory computer-readable storage medium comprising programming code, which when executed by at least one data processor, causes operations comprising: receiving a request to generate a new database table corresponding to a new version of a database table associated with a cloud-based system hosting a cloud-based software application; processing the request to determine a content of the new database table using a data structure of the database table; generating a version identifier corresponding to the new database table; providing, to an external database, the version identifier and the new database table for storage; and controlling a deployment, to a productive system, of the new database table, for the new database table to be used when executing the cloud-based software application.

Example 9: The non-transitory computer-readable storage medium of example 8, wherein the operations further comprise: performing a validation of the new database table by verifying each entry of the content of the new database table; and generating a deployment approval for enabling the deployment, to the productive system, of the new database table.

Example 10: The non-transitory computer-readable storage medium of example 8 or 9, wherein controlling the deployment, to the productive system, of the new database table is based on a schedule associated with the version identifier of the new database table, the schedule indicating a time for switching from an old version of the database table to the new version of the new database table.

Example 11: The non-transitory computer-readable storage medium of any of examples 8 to 10, wherein the database table is stored in an original database different from the external database.

Example 12: The non-transitory computer-readable storage medium of any of examples 8 to 11, wherein the new database table comprises one or more customizations specific to a tenant associated with the cloud-based system.

Example 13: The non-transitory computer-readable storage medium of any of examples 8 to 12, wherein the request to generate the new database table is provided by an external customizing repository configured to directly write data in the external database.

Example 14: The non-transitory computer-readable storage medium of any of examples 8 to 13, to the productive system, of the new database table comprises reading entries of the new database table directly from the external database using the version identifier.

Example 15: A system comprising: at least one data processor; and at least one memory storing instructions, which when executed by the at least one data processor, cause operations comprising: receiving a request to generate a new database table corresponding to a new version of a database table associated with a cloud-based system hosting a cloud-based software application; processing the request to determine a content of the new database table using a data structure of the database table; generating a version identifier corresponding to the new database table; providing, to an external database, the version identifier and the new database table for storage; and controlling a deployment, to a productive system, of the new database table, for the new database table to be used when executing the cloud-based software application.

Example 16: The system of example 15, wherein the operations further comprise: performing a validation of the new database table by verifying each entry of the content of the new database table; and generating a deployment approval for enabling the deployment, to the productive system, of the new database table.

Example 17: The system of example 15 or 16, wherein controlling the deployment, to the productive system, of the new database table is based on a schedule associated with the version identifier of the new database table, the schedule indicating a time for switching from an old version of the database table to the new version of the new database table.

Example 18: The system of any of examples 15 to 17, wherein the database table is stored in an original database different from the external database.

Example 19: The system of any of examples 15 to 18, wherein the new database table comprises one or more customizations specific to a tenant associated with the cloud-based system.

Example 20: The system of any of examples 15 to 19, wherein the request to generate the new database table is provided by an external customizing repository configured to directly write data in the external database and wherein the deployment, to the productive system, of the new database table comprises reading entries of the new database table directly from the external database using the version identifier.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. For example, the logic flows can include different and/or additional operations than shown without departing from the scope of the present disclosure. One or more operations of the logic flows can be repeated and/or omitted without departing from the scope of the present disclosure. Other implementations can be within the scope of the following claims.

What is claimed is:

1. A computer-implemented method comprising:

receiving, by one or more processors, a request to generate a second database table corresponding to a new version of a first database table associated with a cloud-based system hosting a cloud-based software application, wherein the request includes a customized template having one or more customizations that are specific to a tenant, wherein the one or more customizations modify data that is stored in a first column from a first datatype to a second datatype, wherein the customized template is created based on a template selected by the tenant among a set of default templates, the tenant applying the one or more customizations to the selected template, and wherein the second database table is generated based on a difference between one or more datatypes of data stored in a particular column of the first database table and one or more datatypes specified by the customized template for the particular column including one or more of a numerical datatype, a character datatype, a date datatype, and a logical datatype;

determining, by the one or more processors, in response to the request, a content of the second database table using a same data structure as the first database table;

generating, by the one or more processors, a version identifier corresponding to the second database table as a branch number;

providing, by the one or more processors to an external database, the branch number and the second database table for storage;

performing, by the one or more processors, a validation of the second database table by verifying each entry of the content of the second database table, wherein the validation comprises verifying the second datatype of the data stored in the first column;

storing, in the external database, the validated second database table mapped to the branch number;

alerting, by a database trigger of a customizing engine, a development system when the second database table is generated with the branch number to enable the second database table to be propagated to a test system and a productive system; and controlling, by the one or more processors, a deployment, to the test system and the productive system, of the second database table, for the second database table to be used when executing the cloud-based software application, wherein the deployment, to the test system and the productive system, of the second database table comprises reading entries of the second database table directly from the external database using the branch number without replicating the second database table.

2. The computer-implemented method of claim 1, wherein controlling, by the one or more processors, the deployment, to the test system and the productive system, of the second database table is based on a schedule associated with the branch number of the second database table, the schedule indicating a time for switching from an old version of the first database table to the new version of the first database table based on one or more factors including a rule change, a code change, or an entity change, and wherein the computer-implemented method further comprises:

generating a deployment approval for enabling the deployment, to the test system and the productive system, of the second database table to match a timing of a change associated with the one or more factors.

3. The computer-implemented method of claim 2, further comprising:

storing the first database table in an original database different from the external database.

4. The computer-implemented method of claim 1, wherein the request to generate the second database table is provided by an external customizing repository configured to directly write data in the external database.

5. The computer-implemented method of claim 1, wherein the one or more customizations applied to the selected template by the tenant modify a manner in which data is stored in the second database table.

6. The computer-implemented method of claim 1, wherein the difference is determined based on a comparison of the data stored in the particular column of the first database table against the customized template.

7. A non-transitory computer-readable storage medium comprising programming code, which when executed by at least one processor, causes operations comprising:

receiving a request to generate a second database table corresponding to a new version of a first database table associated with a cloud-based system hosting a cloud-based software application, wherein the request includes a customized template having one or more customizations that are specific to a tenant, wherein the one or more customizations modify data that is stored in a first column from a first datatype to a second datatype, wherein the customized template is created based on a template selected by the tenant among a set of default templates, the tenant applying the one or more customizations to the selected template, and wherein the second database table is generated based on a difference between one or more datatypes of data stored in a particular column of the first database table and one or more datatypes specified by the customized template for the particular column including one or more of a numerical datatype, a character datatype, a date datatype, and a logical datatype;

determining, in response to the request, a content of the second database table using a same data structure as the first database table;

generating a version identifier corresponding to the second database table as a branch number;

providing, to an external database, the branch number and the second database table for storage;

performing, by the at least one processor, a validation of the second database table by verifying each entry of the content of the second database table, wherein the validation comprises verifying the second datatype of the data stored in the first column;

storing, in the external database, the validated second database table mapped to the branch number;

alerting, by a database trigger of a customizing engine, a development system when the second database table is generated with the branch number to enable the second database table to be propagated to a test system and a productive system; and controlling a deployment, to the test system and the productive system, of the second database table, for the second database table to be used when executing the cloud-based software application, wherein the deployment, to the test system and the productive system, of the second database table comprises reading entries of the second database table directly from the external database using the branch number without replicating the second database table.

8. The non-transitory computer-readable storage medium of claim 7, wherein controlling the deployment, to the test system and the productive system, of the second database table is based on a schedule associated with the branch number of the second database table, the schedule indicating a time for switching from an old version of the first database table to the new version of the first database table based on one or more factors including a rule change, a code change, or an entity change, and wherein the operations further comprise:

generating a deployment approval for enabling the deployment, to the test system and the productive system, of the second database table to match a timing of a change associated with the one or more factors.

9. The non-transitory computer-readable storage medium of claim 8, wherein the operations further comprise:

storing the first database table in an original database different from the external database.

10. The non-transitory computer-readable storage medium of claim 7, wherein the request to generate the second database table is provided by an external customizing repository configured to directly write data in the external database.

11. A system comprising:

at least one processor; and at least one memory storing instructions, which when executed by the at least one processor, cause operations comprising:

receiving a request to generate a second database table corresponding to a new version of a first database table associated with a cloud-based system hosting a cloud-based software application, wherein the request includes a customized template having one or more customizations that are specific to a tenant, wherein the one or more customizations modify data that is stored in a first column from a first datatype to a second datatype, wherein the customized template is created based on a template selected by the tenant among a set of default templates, the tenant applying the one or more customizations to the selected template, and wherein the second database table is generated based on a difference between one or more datatypes of data stored in a particular column of the first database table and one or more types specified by the customized template for the particular column including one or more of a numerical datatype, a character datatype, a date datatype, and a logical datatype;

determining, in response to the request, a content of the second database table using a same data structure as the first database table;

generating a version identifier corresponding to the second database table as a branch number;

providing, to an external database, the branch number and the second database table for storage;

performing, by the at least one processor, a validation of the second database table by verifying each entry of the content of the second database table, wherein the validation comprises verifying the second data-type of the data stored in the first column;

storing, in the external database, the validated second database table mapped to the branch number;

alerting, by a database trigger of a customizing engine, a development system when the second database table is generated with the branch number to enable the second database table to be propagated to a test system and a productive system; and controlling a deployment, to the test system and the productive system, of the second database table, for the second database table to be used when executing the cloud-based software application, wherein the deployment, to the test system and the productive system, of the second database table comprises reading entries of the second database table directly from the external database using the branch number without replicating the second database table.

12. The system of claim 11, wherein controlling the deployment, to the test system and the productive system, of the second database table is based on a schedule associated with the branch number of the second database table, the schedule indicating a time for switching from an old version of the first database table to the new version of the first database table based on one or more factors including a rule change, a code change, or an entity change, and wherein the operations further comprise:

generating a deployment approval for enabling the deployment, to the test system and the productive system, of the second database table to match a timing of a change associated with the one or more factors.

13. The system of claim 12, wherein the operations further comprise:

storing the first database table in an original database different from the external database.

14. The system of claim 11, wherein the request to generate the second database table is provided by an external customizing repository configured to directly write data in the external database.

* * * * *